Aug. 20, 1968

A. E. ZIERICK 3,397,598

REVERSIBLE HYDRAULIC TRANSMISSION

Filed Nov. 7, 1966

INVENTOR

Ambrose E. Zierick

INVENTOR
Ambrose E. Zierick

INVENTOR
Ambrose E. Zierick

INVENTOR
Ambrose E. Zierick

Aug. 20, 1968　　　　　A. E. ZIERICK　　　　　3,397,598
REVERSIBLE HYDRAULIC TRANSMISSION
Filed Nov. 7, 1966　　　　　　　　　　　　6 Sheets-Sheet 6
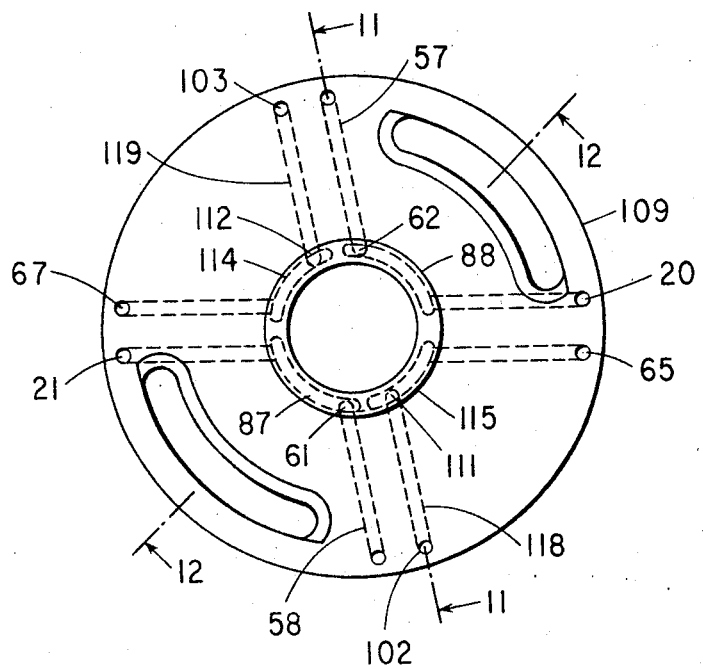
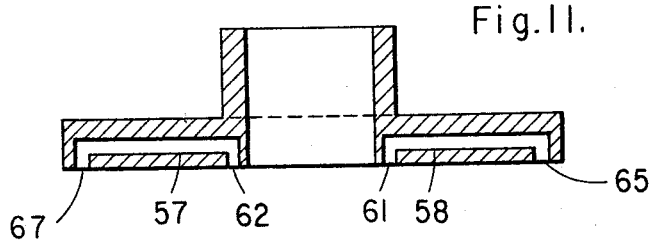
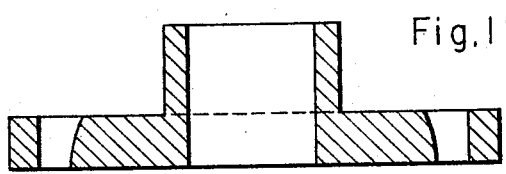
INVENTOR
Ambrose E. Zierick

United States Patent Office 3,397,598
Patented Aug. 20, 1968

3,397,598
REVERSIBLE HYDRAULIC TRANSMISSION
Ambrose E. Zierick, 5700 Arlington Ave.,
Riverdale, N.Y. 10471
Continuation-in-part of application Ser. No. 511,734,
Dec. 6, 1965. This application Nov. 7, 1966, Ser.
No. 592,632
2 Claims. (Cl. 74—794)

ABSTRACT OF THE DISCLOSURE

A hydraulic supercharged variable speed, oscillating reversible cam transmission, adapted to be coupled with a constant speed reversible motor, in which the variable speed transmission combines a planetary gear system with an oscillating reversible cam means in the clutch thereof.

---

The present invention relates to a hydraulic supercharged variable speed, oscillating reversible cam transmission, particularly adapted to coupling with a constant speed reversible motor, in which the variable speed transmission combines a planetary gear system with a novel oscillating reversible cam means in the clutch and is a continuation-in-part of my co-pending application Ser. No. 511,734, filed Dec. 6, 1965.

It is a primary object of the present invention to provide a reversible means in the hydraulic transmission so that a coupled motor driving the transmission can be reversed back and forth, with the coupled transmission following hydraulically forward or in reverse, as the motor rotation is changed, providing reversible means of rotation in the power take-off.

It is a further object of the present invention to provide a variable hydraulic speed transmission with an oscillating reversing cam of the character described, which may be reversed well nigh instantly at the low speeds and may be accelerated into high while in any direction of rotation, and may be advantageously used with and applied to the driving of relatively heavy manufacturing equipment, light machine tools, automotive tractors, conveyors and prime marine power installations.

It is a still further object of the present invention to provide a hydraulic variable speed, oscillating cam transmission of the character described, which is of relatively compact, simple, and sturdy construction, and affords great accuracy in speed variation and reversing with maximum speed and torque in any direction.

The foregoing and other objects and advantages of the hydraulic variable speed, oscillating reversible cam transmission of the present invention will be more readily apparent to those skilled in the art from the embodiment thereof shown in the accompanying drawings, and from the description thereof. It is to be understood, however, that such embodiment is shown by way of illustration only, to make the principles and practice of the invention more readily comprehensible, and without any intent of limiting the invention to the specific details shown.

In the drawings:

FIG. 10 is a right face detail of port disc flange taken on line 10—10 of FIG. 1.

FIG. 11 is a cross section view taken on line 11—11 of FIG. 10.

FIG. 12 is a cross section view taken on line 12—12 of FIG. 10.

Figure 1:
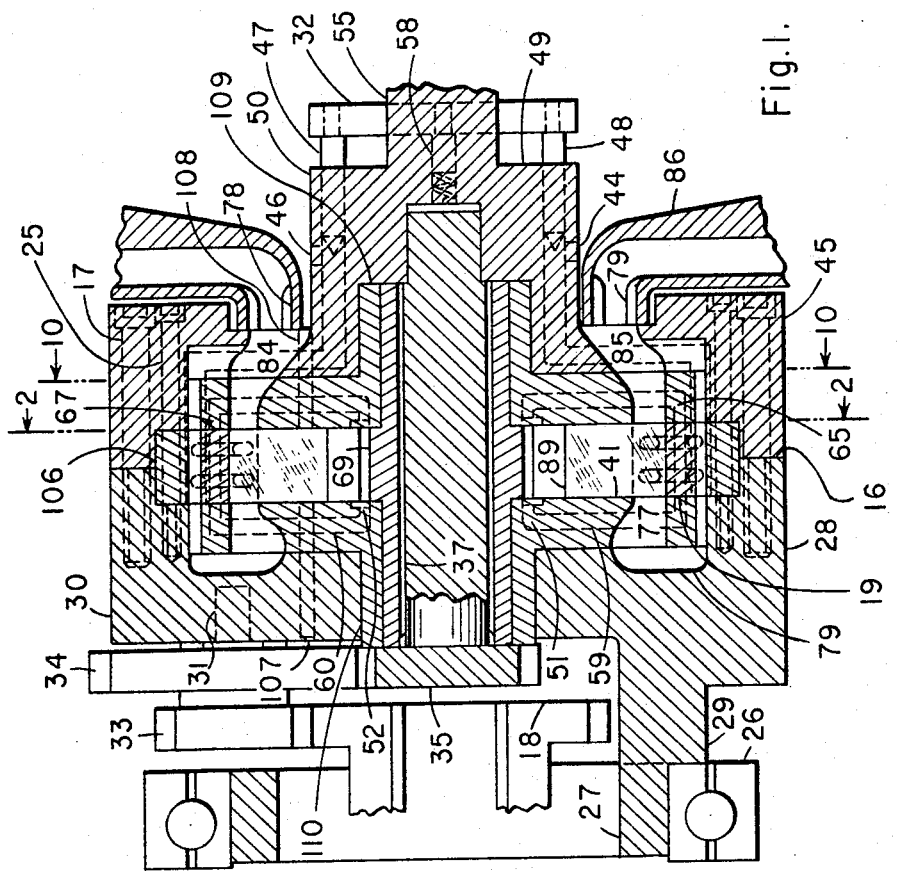
FIG. 1 is a fractional longitudinal sectional and partly elevated view through a hydraulic transmission of my invention taken on line 1–2–3–3–3–2–1 of FIG. 2.

The accompanying drawings illustrate a preferred embodiment of a hydraulic supercharged variable speed transmission with the reversible oscillating cam means of my invention in which a gear housing cylinder 28 having an integral disc 30, carries pivotably mounted studs 31, supporting rotatively gearing 33 and 34, and is driven by pinion 18, the latter press fitted on a motor shaft as illustrated in my aforementioned copending application, except that in the present instance the motor used is provided with reversible electrical means found in standard practice. The following is also found in my copending application, consisting of bearing 26 mounted on spider ring 27, supported by arms 29, these serving as an intermediate bearing support with aforesaid bearing journaled in a hydraulic vessel not shown. In addition, supercharger spout 86, FIG. 1, is also part of the above copending application.

Figure 4:
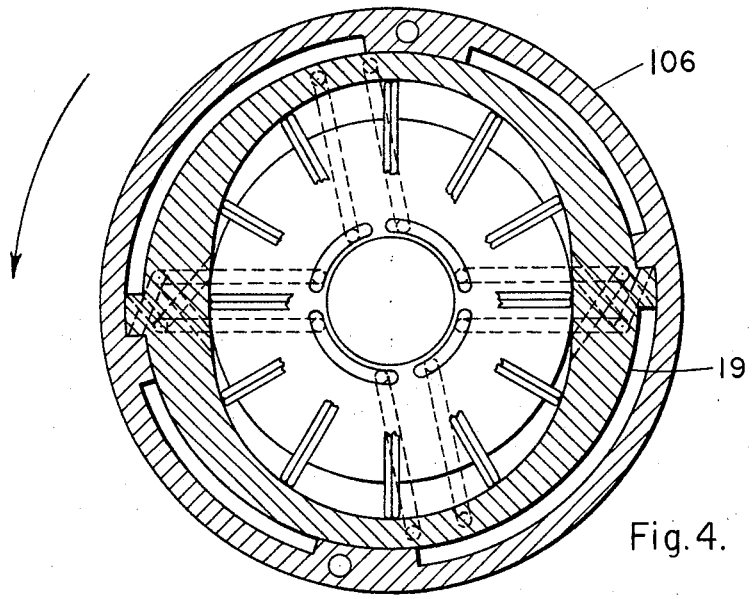
FIGS. 4 and 5 are partly cross sections, also taken on line 2–2 of FIG. 1.
Figure 5:
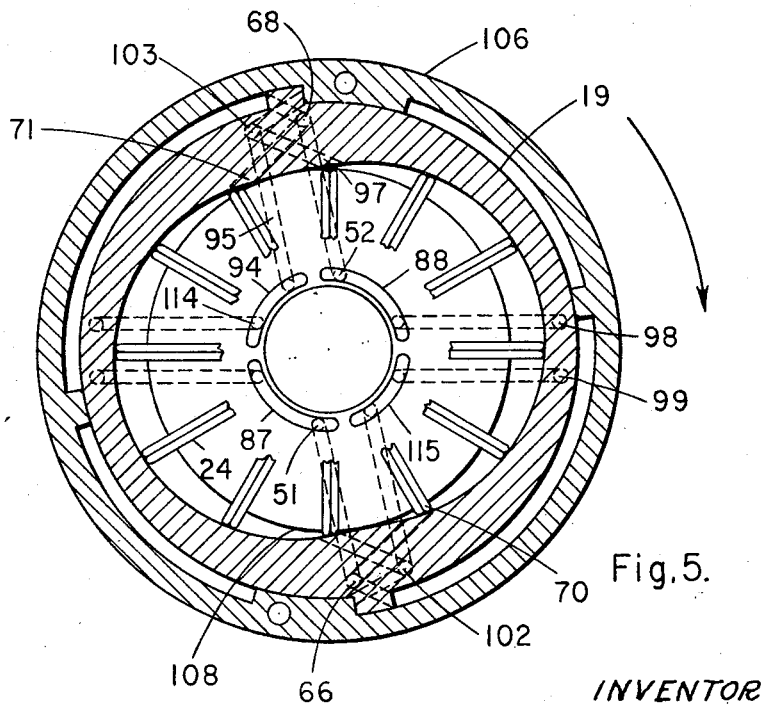
Figure 6:
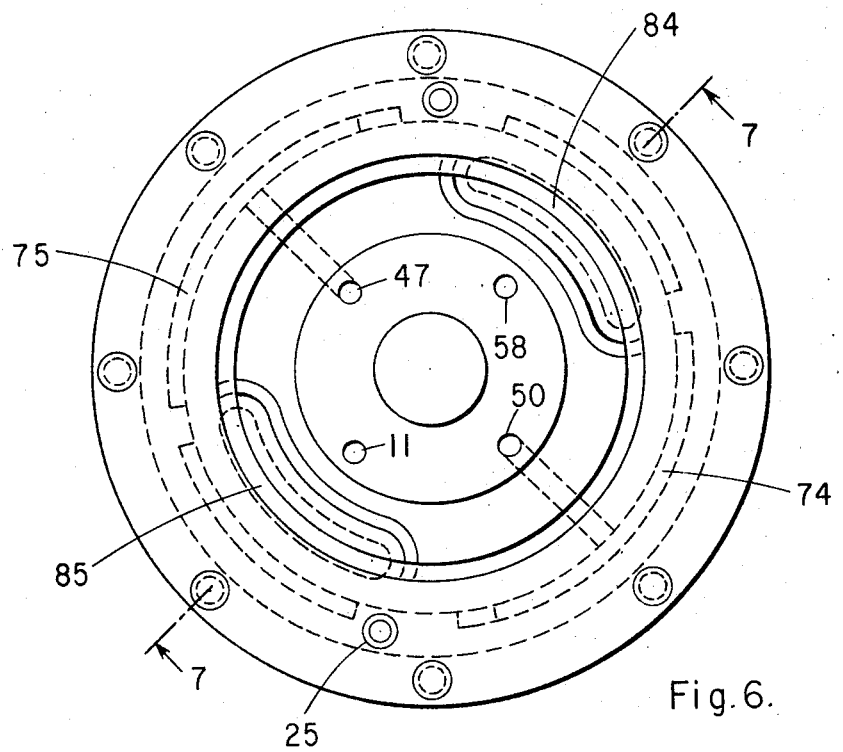
FIG. 6 is a right hand view of FIG. 1.
Figure 9:
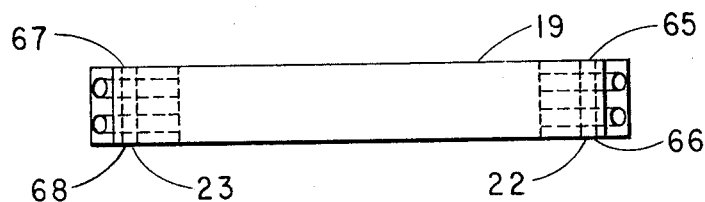
FIG. 9 is a bottom end view of FIG. 8.

The other half of pump housing 45 is bolted to sealed facing of flange 16 by clamping bolts 17 and allows cam 19, FIG. 9, to slip fit rotatively about a quarter revolution in a concentric alignment, shown in detailed FIGS. 4 and 5. Bolts 25 fasten encompassing stop limit ring 106, FIG. 1, to keep the latter from turning, and provides the limit stops for oscillating cam in a limited space. Dowels 107 and 108 fasten a pair of port disc flanges 109 and 110. FIG. 1, shown detailed in FIG. 10, which are also screwed in place, the latter not shown for convenience of illustrating.

Figure 2:
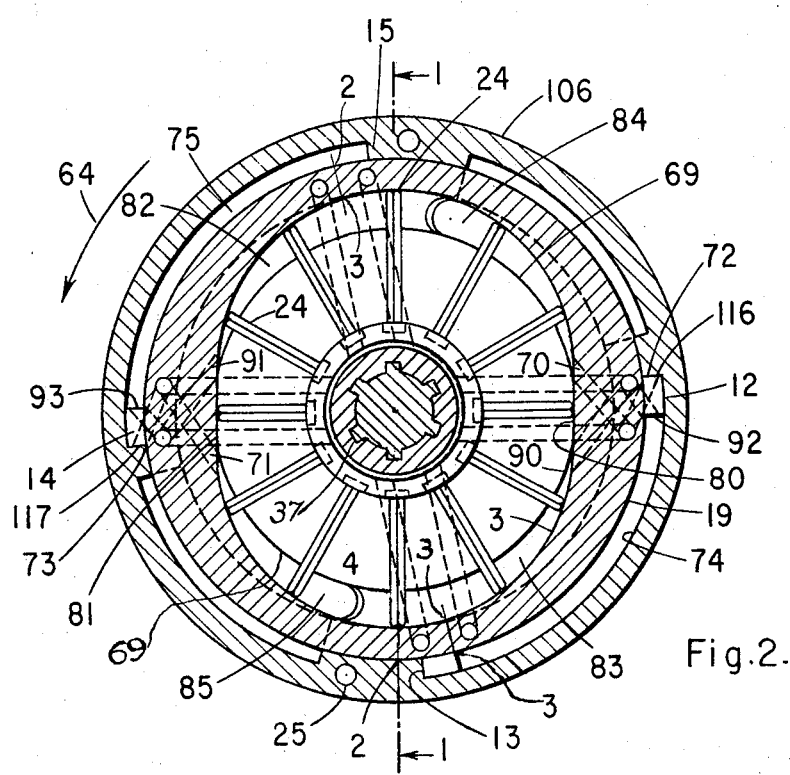
FIGS. 2 and 3 are partly cross sections taken on line 2–2 of FIG. 1.

In FIG. 2, spindle 37 and rotor 69 are rotating counterclockwise as designated by arrow 64 in which pump housing 45 is being driven by cam 19 and differentially by co-acting planetary gear train as illustrated in my previous Patent No. 3,159,058, Dec. 1, 1964.

Cam 19 having integrally extending arms 12 and 14, which are confined in compressionwise accurate slots 74 and 75 respectively, have a limited range of movement, in which cam 19 oscillates back and forth. In any direction of rotation cam 19 is always in a forward position driving with extended integral arms 12 and 14 against end stop surfaces 116 and 117 respectively which in this instance is counterclockwise rotation.

Figure 3:
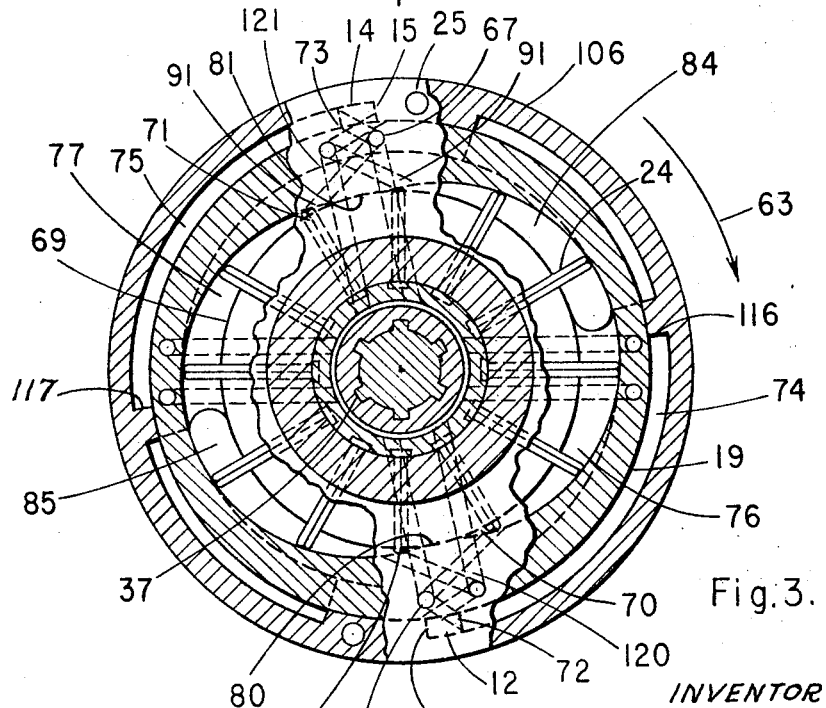

In FIG. 3 rotation is reversed or clockwise as designated by arrow 63, in which pump housing 45 is being driven by cam 19 and differentially by co-acting gear train. In this instance cam 19 oscillating in reverse phase almost a quarter turn before its extended integral arms 12 and 14 reach the other extreme of their confined arcuate slots, and then begins driving against end stop surfaces 13 and 15 respectively.

Sliding vanes 24 are always centrifugally stressed when rotor 69 is rotating and the contacting of sliding vanes on cam 19 frictionally stresses the latter torquewise until the cam reaches either of its end stops, depending on the direction of rotation.

In FIG. 2, for counterclockwise rotation, arcuate ports 85 and 84 are each on a declining slope of cam compression mounds 81 and 80 respectively going counterclockwise and its hydraulic confluence from arcuate ports 85 and 84 lead into compression chambers 83 and 82 respectively.

Figure 8:
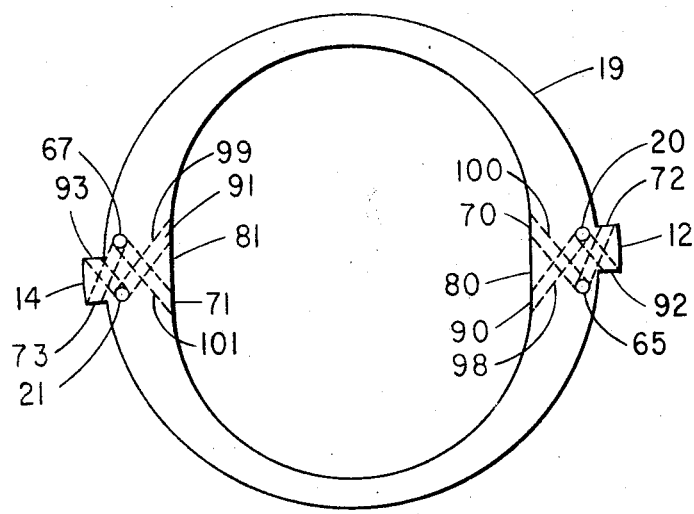
FIG. 8 is a face detail of cam showing right face view taken on line 2—2 of FIG. 1.

In FIG. 8, cam 19, ports 90 and 91 are on the inner side of cam 19 and the hydraulic surge from their respective pressure chambers 83 and 82 forced into connecting ducts 98 and 99, the latter being located slightly below cam summit where efficacious volumetric scavenging of sliding vanes obtains, to emerge from ports 92 and 93 to discharge into arcuate pressure chambers 74 and 75. The discharge from ports 92 and 93 from extended integral arms 12 and 14, of cam 19, causes the latter to oscillate rotatively counterclockwise for driving against end stop 116 and 117 of pump housing 45 for torque increase in counterclockwise rotation.

In FIG. 3 for clockwise rotation, arcuate ports 84 and 85 are on the declining slope of cam compression mounds 81 and 80, going clockwise and its hydraulic confluence from arcuate ports 84 and 85 lead into compression chambers 76 and 77 respectively.

In FIG. 8, cam 19, opposite ports 70 and 71, being on the inner side of cam ring 19 and the hydraulic surge from their respective pressure chambers 76 and 77 into connecting ducts 100 and 101, emerge from ports 72 and 73 to discharge into arcuate pressure chambers 74 and 75 respectively. The discharge from ports 92 and 93 from extended arms 12 and 14 integral with cam 19 causes the latter to oscillate rotatively clockwise for driving against opposite end stops 13 and 15 of pump housing 45 to increase torque in clockwise rotation.

Whenever cam 19 is oscillated and reaches its end extremity, ports 20–65–21 and 67 are in register with similar designated ports of FIG. 10, which preferably now is in a clockwise rotative position. With a clockwise rotation in effect, ports 70 and 71 are pressurized hydraulically and fluidly radial ducts 57 and 58 of FIG. 11, and 59 and 60, FIG. 1, are discharging through outlets 61 and 62, FIG. 11, and opposite discharge ports 51 and 52, FIG. 1, causing a pressurized stress on sliding vanes 24 along their tops 89. This pressurization along tops of passing vanes 89, prevails during rotor rotation passing open arcuate slots 87 and diametrically opposite arcuate slot 88, which forces sliding vanes downward on sloping part of cam 19 to seal compression action hydraulically.

The adjacent open arcuate slots 114 and 115 with ports 111 and 112 and radial ducts 118 and 119, FIG. 10, are in fluid contact with ports 20 and 21, cam 19, and rear radial ducts 120 and 121, FIG. 3, and cross-over duct 65 and 67 respectively to discharge at 90 and 91 into a clockwise rotation vacuum.

At ports 102 and 103, FIG. 10, fluid outlet 92 and 93, FIG. 8, may be blocked against back stop 13 and 15 respectively, which pressure is negligible, since discharge ports 90 and 91, FIG. 3, have no back pressure.

Whenever cam 19 with integral compression mounds 80 and 81 is oscillated from one end stop to the other for changing rotation, side ports 65 and 66 and 67–68, FIG. 9, are in fluid engagement in that station for its particular rotation designated, preferably clockwise, and the station the ports have been shifted from are blocked off, in which intake ports 98 and 99 are shown covered by cam 19, FIG. 5, and oppositely the cam covers similarly the ports opposite. It is obvious that in FIG. 4 conditions if reversed for counterclockwise rotation, the cam compression mounds 80 and 81 would have their fluid conductivity as shown, and station just vacated would have their respective ports covered by cam to block off fluid conductivity for reverse rotation in this instance counterclockwise.

In FIG. 1, speed regulator disc 32 is shown in part taken from my Patent No. 3,159,058, Dec. 1, 1964, which regulates the in and out motion of plungers 47 and 48 for bleeding fluid from compression chambers 76 and 77 and thereby controlling the output speed of the pump housing 45 and integral shaft 55. Plungers 47 and 48 when fed into hub 50 far enough, can cover up discharge ports 44 and 46 to prevent bleeding and thereby output speed of shaft 55 would be at a maximum speed.

Figure 7:
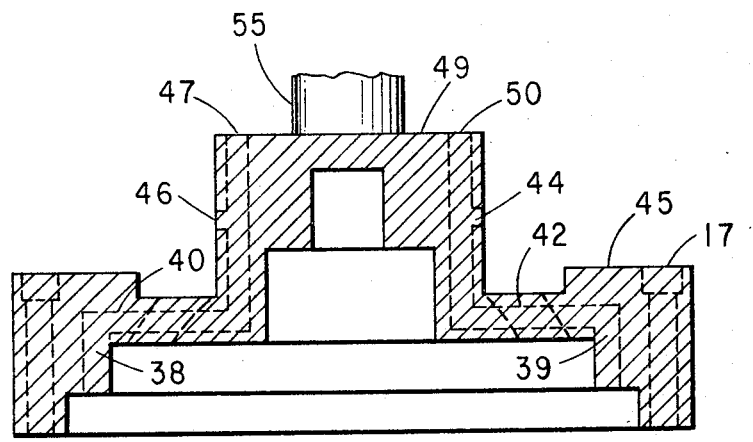
FIG. 7 is a cross section view of FIG. 6, taken on line 7—7.

It is obvious that whatever rotation is in effect the discharge ports 72 and 73 or 92 and 93 are discharging into arcuate pressure chambers 74 and 75, FIG. 3. The pressure chambers 74 and 75 have outlet ports 38 and 39 and radial conduits 40 and 42 fluidly connected with bleeding recesses 47 and 50 in hub 49, FIG. 7. The bleeding discharge ports 44 and 46 relieve recesses 47 and 50 according to the blocking off of discharge ports 44 and 46 by in and out motion of their respective plungers 48 and 47, which regulate the output speed of shaft 55 regardless whether its rotation is clockwise or counterclockwise.

It will be apparent that in the foregoing description I have described a clutch having an oscillating ring cam that advances to a driving stance according to direction of impeller rotation and when the impeller is reversed the reverse cycle of oscillation advances ring cam to a reverse driving stance for reverse rotation of impeller.

It is also apparent that when ports 44 and 46 are opened by the moving out of disc 32 with contained plungers 47 and 48, partially forced by spring plungers 11 and 58, against disc 32 as illustrated more completely in my Patent No. 3,159,058, the bleeding through ports 44 and 46 is either partially opened or fully opened, depending upon the degree of speed throttling desired.

It is therefore most apparent that the above bleeding of the speed control is basically similar and regardless of direction of rotation the output speed through the clutch remains the same, regardless of reversing.

This completes the description of one embodiment of the variable reversible hydraulic transmission of the present invention. It will be readily apparent that numerous variations and modifications may be made in such stationary reversible hydraulic transmission by anyone skilled in the art, in accordance with the principles of the invention hereinabove set forth, without the exercise of any inventive ingenuity. I desire, therefore, to be protected for any and all such variations and modifications that may be made within the spirit of the invention and the scope of the claims hereto appended.

What I claim is:

1. A stationary hydraulic variable speed, reversible oscillating cam transmission comprising, in combination, a stationary, liquid tight housing, a driving shaft extending into said housing, the inwardly-projecting shaft of said driving shaft having a pinion connected thereon, a fluid clutch pump within said housing, said pump including a cylinder having a driven shaft connected thereto at one end thereof, said cylinder and said driven shaft in axial alignment with said driving shaft, said driven shaft rotatably supported on said housing; a pump rotor housing including an oscillating cam ring mounted on said cylinder for rotation therewith, said oscillating cam ring having diametrically opposed internal compression mound portion of gradually reduced radii and defining sloping portions at each side and encompassed by an outer ring fixed to said pump rotor housing, said oscillating cam ring having diametrically opposite integral arms extending outwardly opposite each of said compression mound portions, said encompassing outer ring having internal arcuate recessions for said integral arms of said cam ring to oscillate limit-wise within said arcuate recessions; a rotor including radially-displaceable vanes within said rotor housing, said rotor including a shaft rotatably disposed within said cylinder and extending towards said driving shaft, said rotor shaft having a pinion connected to its end adjacent said driving shaft; planetary gears mounted on said cylinder adjacent said driving shaft, rotatable means concentric with said driving shaft supporting said cylinder end, each of said planetary gears having a section thereof meshing with said driving shaft pinion and a section meshing with said rotor shaft pinion, said fluid clutch pump having a fluid passage provided therein from said rotor housing through compression mound summit ports of said cam ring, said summit ports having ducts emerging from integral arms of said cam, ports through said arcuate recession of said encompassing outer ring extending passagewise through the wall of said cylinder and having an exterior inlet recess into said cylinder and an outlet port from said cylinder, and means rotatable with said cylinder for adjustably opening and closing one of said passage recesses.

2. The stationary hydraulic reversible transmission of claim 1, wherein said oscillating cam ring having diametrically opposite exteriorly, integral arms, said integral arms extending midway from the inner maximum diametrical cam sloping, said intake summit ports being slightly below each maximum cam slope; wherein efficacious volumetric scavenging of sliding vanes is obtained, a pair of parallel crosswise ducts disposed axially and located inwardly from each of said integral arms, said ducts having openings on both sides of said cam near said intake summit ports each fluidity connected to one of said crosswise ducts, a discharge port located on either side of said integral arms, said discharge ports each fluidly connected separably to one of said respective crosswise ducts.

References Cited

UNITED STATES PATENTS

| | | | |
|---|---|---|---|
| 1,332,516 | 3/1920 | O'Donnell | 103—117 |
| 1,908,612 | 5/1933 | Johnson | 103—3 X |
| 2,861,517 | 11/1958 | Neff. | |
| 2,932,991 | 4/1960 | Zierick | 74—794 |
| 3,058,557 | 10/1962 | Zierick | 74—794 X |
| 3,130,681 | 4/1964 | Fetherston. | |
| 3,159,058 | 12/1964 | Zierick | 74—794 |

FRED C. MATTERN, JR., *Primary Examiner.*

THOMAS C. PERRY, *Assistant Examiner.*